May 21, 1940. A. F. HOESEL 2,201,728
THERMOSTATICALLY CONTROLLED EXPANSION VALVE
Filed July 30, 1938

INVENTOR
Anthony F. Hoesel

Patented May 21, 1940

2,201,728

UNITED STATES PATENT OFFICE

2,201,728

THERMOSTATICALLY CONTROLLED EXPANSION VALVE

Anthony F. Hoesel, Chicago, Ill., assignor to Peerless of America, Incorporated, Chicago, Ill., a corporation of Illinois Application July 30, 1938, Serial No. 222,126

1 Claim. (Cl. 236—92)

The present invention relates to thermostatically controlled expansion valves for compression type refrigerating systems and more particularly to stop and start the refrigerant feeding function of this type of valve whenever the refrigerant pressure, within the cooling unit, increases or decreases, respectively, from a certain predetermined pressure.

Thermostatically controlled expansion valves have what is usually termed a power element, comprised, in part, of either a diaphragm or bellows forming part of a closed pressure responsive assembly having, in combination, such diaphragm or bellows connected to a temperature feeler bulb by means of a capillary tube. This power element assembly is charged with a thermostatic fluid, usually the same fluid as used in the refrigerating system, and the extension or contraction of the flexible wall, diaphragm or bellows, acting upon the valve proper, during changes in temperature of the temperature feeler bulb, results in an opening or closing of such valve; and thereby regulates the feed of the refrigerant fluid to the cooling unit.

Since the main purpose, of thermostatically controlled expansion valves, is to feed refrigerant fluid, to a cooling unit, in such quantities as will result in a certain superheat, of the vapor issuing from such cooling unit; and, furthermore, since the temperature feeler bulb, placed at the outlet of such cooling unit, is of higher temperature than the temperature of the refrigerant fluid, immediately after its passage through the valve, there occurs the possibility of the thermostatic fluid condensing within the diaphragm or bellows chamber adjacent the valve body.

If, due to particular design, such condensation occurs, it becomes necessary to so charge the closed pressure responsive assembly, with sufficient thermostatic fluid, so that whenever maximum condensation occurs, within such diaphragm or bellows chamber, there will still be some thermostatic fluid, in liquid phase, in the temperature feeler bulb. In the art, such charging is generally termed "liquid charged."

Now, whenever a thermostatically controlled expansion valve is liquid charged, the quantity of thermostatic fluid is such that at no time is the entire charge in its vapor phase. Therefore, throughout the entire operating range, of a refrigerating system, the valve usually tends to feed refrigerant to the cooling unit; however, only in such quantities as will maintain the superheat of the exit vapor in accordance with whatever the valve is adjusted to maintain.

A refrigerating system, served by such liquid charged valve, will operate under abnormally high pressures, in the cooling unit and especially so at the start of the refrigerating cycle, and until the cooling unit temperature has approached its normal operating temperatures. This results in increased power capacities necessary to overcome these high pressures as compared to the power capacities necessary to maintain the normal operating conditions.

An object of my invention is to provide so-called liquid charged thermostatically controlled expansion valve with a movement transmitter which has a definite extended length below a certain maximum predetermined refrigerant pressure and a contracted length at pressures above the predetermined pressure; the said movement transmitter, in its extended length, opening a valved passage responsive to movement of a thermostatic flexible walled member.

Another object is to provide a so-called liquid charged thermostatically controlled expansion valve which will have the same operating characteristics as the so-called gas charged thermostatically controlled expansion valve.

A further object is to provide a thermostatically controlled expansion valve having all the characteristics of the so-called gas charged thermostatically controlled expansion valve, but minus the possibility of loss of control responsive to temperatures of the temperature feeler bulb.

Other objects and advantages will be apparent from the following specification and drawing, in which—

Figures 1, 2, 3:
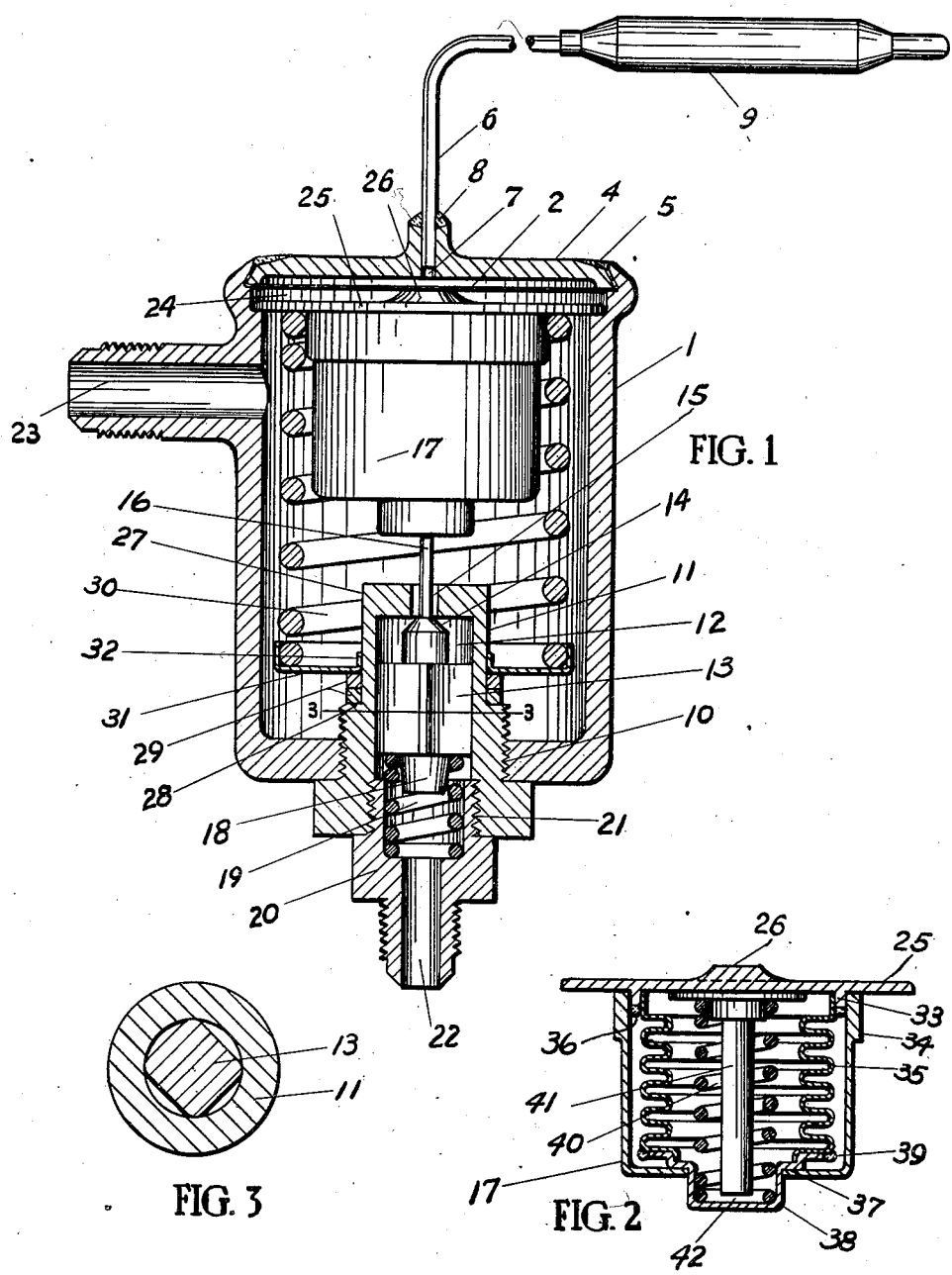
Figure 1 is a cross-sectional view of a thermostatically controlled expansion valve incorporating my invention.
Figure 2 is a cross-sectional view of the movement transmitter of Figure 1.
Figure 3 is a cross-sectional view along line 3—3 of Figure 1.

Referring to Figure 1, a casing 1 is closed, at its upper end, by means of a flexible diaphragm 2 and a diaphragm cover 4. It will be noticed that the marginal edge of the diaphragm cover 4 is at an angle to the perpendicular, and the complementary portions of the casing 1 and diaphragm 2 are mechanically rolled to the marginal edge of the diaphragm cover 4; thereby making a joint having mechanical strength which is supplemented by soldering, shown at 5, in order to make the assembly pressure tight.

In the center of the diaphragm cover 4 is a bore 6 engaging a capillary tube 7 soldered at 8 and having, at its free end, a temperature feeler bulb 9.

The space in the temperature feeler bulb 9, the capillary tube 7, and between the diaphragm 2 and the diaphragm cover 4, is charged with a thermostatic fluid, usually the same fluid as circulated in the refrigerating system served by the particular thermostatically controlled expansion valve. The amount of thermostatic charge is such that whenever the entire space, between the diaphragm 2 and the diaphragm cover 4, and during the maximum extension of the diaphragm 2, is filled with condensed thermostatic fluid, there will still remain some thermostatic fluid, in its liquid phase, in the temperature feeler bulb 9. In consequence of such thermostatic charging, the pressure exerted, by the diaphragm 2, will always be directly responsive to the thermal condition of the temperature feeler bulb 9, whenever the casing 1 is at a lower temperature than that of the temperature feeler bulb 9, which is the condition normally obtaining during operation.

The casing 1 has a threaded bore 10 engaging a valve cage 11 having a bore 12 in which is mounted a movable valve 13 having a seat 14 coacting with a bore 15 through which the pusher pin 16, integral with the valve 13, projects and normally contacts the movement transmitter 17. At its bottom portion, the valve 13 has a boss 18 serving to center a valve spring 19, which constantly urges the valve 13 to a closed position. The valve spring 19 is seated, at its lower end, in an inlet fitting 20 engaging a threaded bore 21 in the valve cage 11 and having a refrigerant inlet 22.

The casing 1 has an outlet 23 and a recess 24 which provides an abutment for the cover 25 of the movement transmitter 17; thereby limiting the extension movement of the diaphragm 2 which contacts the raised boss 26 of the movement transmitter 17.

The valve cage 11 has a reduced diametral portion 27, which provides a seat 28 for spring pressure adjusting washers 29. The removal or addition of one or more spring pressure adjusting washers 29 results in a corresponding extension or compression of the diaphragm spring 30 which, at its lower end, engages a spring retainer 31 having a bore 32 engaging the reduced diametral portion 27 of the valve cage 11, and seated upon the spring pressure adjusting washers 29 as shown.

The upper end, of the diaphragm spring 30, seats against the cover 25 of the movement transmitter 17 and the pressure, due to the compression of the diapragm spring 30, is directly transmitted to the diaphragm 2 and against the pressure exerted by the thermostatic charge.

In Figure 2, the movement transmitter 17 comprises a cover 25 having a raised boss 26 at its top and an annular portion 33 at its lower side. The outside of the said annular portion 33 has soldered thereto a cup 34, and the inside of said annular portion 33 has soldered thereto a bellows 35. The soldering is indicated at 36.

The lower end, of the cup 34, has a bore 37 in which loosely plays a bellows cover 38 soldered to the bellows 35 as indicated at 39. Inside of the bellows 35 is disposed a spring 40 tending to keep the bellows 35 in an extended condition. Also inside of the bellows 35 is a stop pin 41 which limits the contraction of the bellows 35 to the amount of distance as indicated at 42.

With the aid of the above disclosure, we shall now design, for certain assumed conditions, a thermostatically controlled expansion valve embodying the invention. The manner in which the particular problem is approached may be employed for any other set of conditions and the variables, for other conditions, are so well known in the art that it is presumed a practitioner, in the art, will, from this disclosure, be enabled to solve any particular problem in the employment of the invention.

We shall make the following assumptions:

First: The valve to control refrigerant feed to a cooling unit normally operated at a 40° F. temperature, but periodically closed down for periods of time sufficient for the cooling unit to attain temperatures of 80° F. or even higher.

Second: The refrigerant to be dichlorodifluoromethane, which is commonly called Freon or F12.

Third: The thermostatic charge to be Freon.

Fourth: The vapor issuing from the cooling unit to have approximately 10° F. superheat.

Fifth: Diaphragm 2 to have an effective area of 3 square inches.

Sixth: Bellows 35 to have an effective area of 1 square inch.

Seventh: Valve spring 19 to exert a force of 8 pounds urging the valve 13 to its closed position.

Eighth: Valve to cease feeding at, say, 46° F. cooling unit temperature or its equivalent in pressure of the refrigerant contained therein, which, in this particular instance, is 57.35 pounds per square inch absolute.

The two unknown quantities are the desired pressures of the diaphragm spring 30 and the bellows spring 40.

To solve for superheat setting (the desired pressure of the diaphragm spring 30), we consult a temperature-pressure table for Freon, and note that at 40° F. we have a pressure of 51.68 pounds per square inch absolute. For a 10° F. superheat, we find 40° F. plus 10° F.=50° F.= 61.39 pounds per square inch absolute, which will be the pressure in the thermostatic system due to the temperature feeler bulb 9 being at 50° F.

Now the bottom side, of the diaphragm 2, will be subjected to 51.68 pounds per square inch absolute and the top side will be subjected to 61.39 pounds per square inch absolute; and, to make the valve operative under the desired conditions, we must put the diaphragm in practically balanced condition.

61.39 minus 51.68=9.71 pounds per square inch of unbalanced pressure on diaphragm 2.

9.71×3=29.13 total pounds of unbalanced pressure on diaphragm 2.

Now, since the valve 13 cannot open until the 8 pound force of valve spring 19 is overcome, we have 29.13 minus 8=21.13 necessary pressure to be exerted by the diaphragm spring 30 in order to maintain a 10° F. superheat.

To solve for the necessary force to be exerted by the bellows spring 40, we shall assume that the bellows 35 contains air at, say 13.5 pounds per square inch absolute, at the 40° F. temperature. Consulting the temperature-pressure table again, we find that the pressure at 40° F.=51.68 pounds per square inch absolute. Since the bellows 35 has an effective area of 1 square inch, we now have 51.68 minus 13.5=38.18 pounds pressure necessary. Since the valve 13 is held, to its seat, by the valve spring 19, which exerts a pressure of 8 pounds, we shall need a bellows spring 40 having a pressure of 38.18 plus 8=46.18 pounds.

While the specification and drawing show and describe a specific concept, of the invention, it is understood that variations may be employed which would fall within the spirit and scope of the invention, which is limited only to the claim hereto appended.

I claim:

In a thermostatically controlled expansion valve the combination of a casing having an inlet and an outlet, a valved passage comprising, in part, a movable valve, between said inlet and said outlet and controlling the rate of refrigerant circulation therebetween responsive to the demand of a flexible thermostatic means, a space between said movable valve and said thermostatic means, a pressure contractible motion transmitter in said space and comprising a hermetically sealed bellows member having a definite extended length at external pressures below a predetermined maximum, a compression spring within said bellows and tending to maintain the extended length between spaced abutments and abutment means to limit the contraction of said bellows member at external pressures above the predetermined maximum.

ANTHONY F. HOESEL.